J. Z. MILLER.
CLUTCH LOCK FOR AUTOMOBILES.
APPLICATION FILED DEC. 8, 1917.
1,260,237. Patented Mar. 19, 1918.
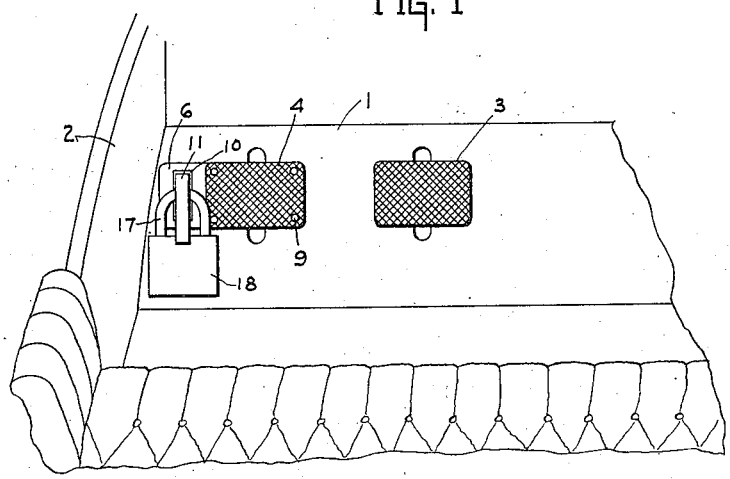
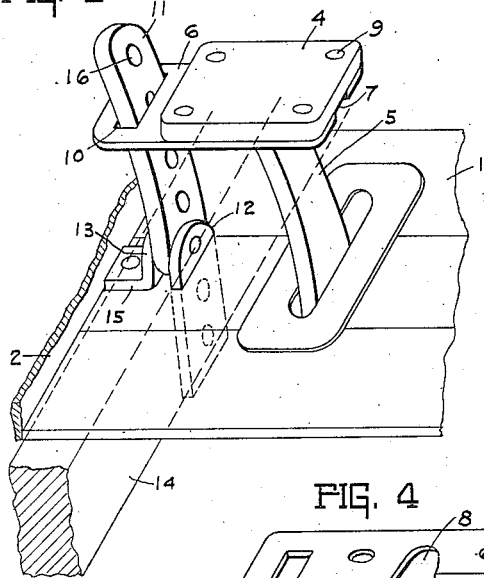
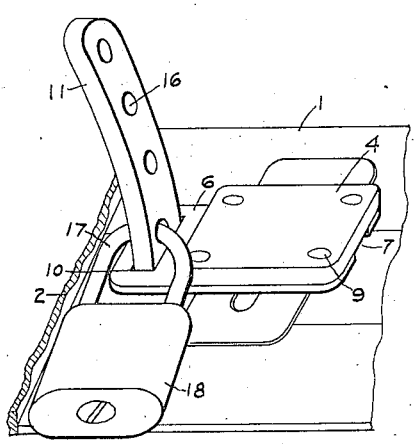
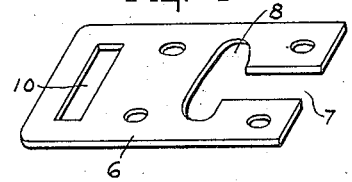
INVENTOR
JOHN Z. MILLER,
BY
*Lockwood & Lockwood*
ATTORNEYS.

UNITED STATES PATENT OFFICE.

JOHN Z. MILLER, OF INDIANAPOLIS, INDIANA.

CLUTCH-LOCK FOR AUTOMOBILES.

1,260,237.  Specification of Letters Patent.  Patented Mar. 19, 1918.

Application filed December 8, 1917. Serial No. 206,157.

*To all whom it may concern:*

Be it known that I, JOHN Z. MILLER, a citizen of the United States, and a resident of Indianapolis, county of Marion, and State of Indiana, have invented a certain new and useful Clutch-Lock for Automobiles; and I do hereby declare that the following is a full, clear, and exact description thereof, reference being had to the accompanying drawings, in which like letters refer to like parts.

This invention relates to a clutch lock for automobiles, the prime feature of which is the provision of a plate for attachment with the clutch operating pedal and shank, which plate is provided with a slot for the reception of a perforated bar. Another feature of the invention is the provision of means for pivotally attaching the bar to parts of the automobile, and arranging the same so that when the pedal is depressed to release the clutch it will be impossible to disconnect the bar from the automobile.

A further feature of the invention is the provision of a lock, the shank of which is adapted to be introduced through the perforations in the bar, whereby the clutch will be locked into open position and held against reëngagement with the clutch seat, so long as the lock remains in engagement with the bar and a further feature of the invention is the positioning of the bar and lock in such close proximity to one wall of the body of the vehicle as to render it extremely difficult for any one to break the lock or disengage the same from the bar, except by unlocking the same.

The nature of the invention will be more fully understood from the accompanying drawings and the following description and claims:

Figure 1 is a perspective view of the front portion of an automobile, showing the locking mechanism applied to use. Fig. 2 is an enlarged detail perspective view of the clutch operating pedal in its locked position. Fig. 3 is a similar view with the clutch operating pedal in unlocked position and Fig. 4 is a perspective view of the locking plate removed from the pedal.

Referring to the drawings in which similar reference numerals designate corresponding parts throughout the several views, 1 indicates the floor of an automobile, 2 one side wall thereof, 3 the brake operating pedal and 4 the clutch operating pedal, the pedals 3 and 4 being of any preferred construction and attached to the usual form of shank 5.

It is well understood by those familiar with the operation of automobiles that when the clutch is disengaged from the clutch seat, it is impossible to impart driving power to the wheels of the automobile from the motor, and in order to lock the clutch out of engagement with the clutch seat, a plate 6 is attached to the pedal 4, preferably to the under face thereof, or may be made integral with the pedal, but in order to attach the plate to pedals already in use, one end of the plate is provided with a channel 7, which terminates in a transverse recess 8 and by entering the shank 5 through the channel and into the recess, the plate may be placed underneath the pedal and secured thereto in any suitable manner, as by means of rivets 9.

One end of the plate 6 projects beyond the end of the pedal 4 and is provided with a slot 10 through which is adapted to extend a bar 11, said bar being pivotally secured at its lower end between straps 12 and 13, the strap 12 extending downwardly through the floor 1 and being secured in any preferred manner to the side frame 14 of the body structure, while the strap 13 is provided with an angular foot 15 which is attached to the floor 1.

The bar 11 is provided with a plurality of holes or perforations 16 through which is adapted to be extended the shank 17 of a lock 18, which lock may be of the usual or any preferred construction. The bar 11, in addition to being pivoted, is curved to correspond to the curvature of the shank 5, so that the pedal and shank may be readily operated without binding on the bar 11, or creating undue friction therewith.

When it is desired to lock the clutch out of engagement with the clutch seat, so that it will be impossible to impart motion to the wheels of the machine by means of the motor, downward pressure is applied to the pedal 4 and while in its downward position the lock 18 is engaged with one of the holes in the bar 11 and it will be readily seen that so long as the lock is in engagement with the bar it will be impossible to elevate the pedal a sufficient distance to reëngage the clutch with the clutch seat.

It will likewise be seen that by positioning the bar 11 adjacent the wall 2 of the vehicle body anyone would experience considerable difficulty in endeavoring to break or otherwise disengage the lock from the shank without first unlocking the same in the usual manner, and it will likewise be seen that when the plate is in its lowered position the pivotal point of the bar 11 is covered over so that it cannot be reached for disengagement.

It will likewise be seen that in view of the simplicity of the device and the construction, it can be readily and easily attached to the parts of the automobile and at a minimum expense.

The invention claimed is:—

1. In a clutch lock for automobiles, the combination with a clutch shank, and a pedal therefor, of a plate carried by the pedal, and having a slot at one end, a pivotally mounted bar adapted to enter said slot and means for engagement with the bar for holding said pedal and shank in lowered position.

2. A clutch lock for automobiles comprising the combination with a clutch shank, and a pedal therefor, of a plate attached to said pedal and projecting beyond one end thereof, said projecting end having a slot, a perforated bar extending through said slot, means to pivotally attach the lower end of the bar to parts of the automobile, and a lock adapted to engage the perforations in said bar for holding the pedal and shank in lowered position.

3. A clutch lock for automobiles comprising the combination with an automobile body, a clutch shank and a pedal therefor, of a perforated bar pivotally secured to parts of the automobile body and adjacent one wall thereof, an extension on the pedal having a slot through which said bar extends, and a lock adapted to engage the perforations in the bar for holding the pedal in lowered position.

In witness whereof, I have hereunto affixed my signature.

JOHN Z. MILLER.

Copies of this patent may be obtained for five cents each, by addressing the "Commissioner of Patents, Washington, D. C."